United States Patent
Miyashita

(10) Patent No.: US 7,235,271 B2
(45) Date of Patent: Jun. 26, 2007

(54) CHEESE-LIKE DAIRY PRODUCTS AND PROCESS FOR PRODUCING THE SAME

(75) Inventor: Shuhei Miyashita, Hokkaido (JP)

(73) Assignee: Mahoroba Co., Ltd., Sapporo-shi (JP)

( * ) Notice: Subject to any disclaimer, the term of this patent is extended or adjusted under 35 U.S.C. 154(b) by 664 days.

(21) Appl. No.: 10/473,586

(22) PCT Filed: Apr. 10, 2002

(86) PCT No.: PCT/JP02/03569

§ 371 (c)(1),
(2), (4) Date: Oct. 9, 2003

(87) PCT Pub. No.: WO02/082916

PCT Pub. Date: Oct. 24, 2002

(65) Prior Publication Data

US 2004/0091576 A1    May 13, 2004

(30) Foreign Application Priority Data

Apr. 10, 2001 (JP) .............................. 2001-110756

(51) Int. Cl.
    *A23C 9/12* (2006.01)
(52) U.S. Cl. ............................ 426/36; 426/42; 426/43; 426/582

(58) Field of Classification Search ................. 426/34, 426/36, 42, 43, 580, 582
See application file for complete search history.

(56) References Cited

FOREIGN PATENT DOCUMENTS

| JP | 1-124351 | 5/1989 |
|---|---|---|
| JP | 9-187793 | 7/1997 |

OTHER PUBLICATIONS

M.A. Casadei et al.: "Heat resistance of *Paenibacillus polymyxa* in relation to pH and acidulants" Journal of Applied Microbiology, vol. 89, No. 5, pp. 801-806 2000.

*Primary Examiner*—Leslie Wong
(74) *Attorney, Agent, or Firm*—Oblon, Spivak, McClelland, Maier & Neustadt, P.C.

(57) ABSTRACT

The present invention relates to a method of producing a cheese-like dairy product, characterized by adding at least 10 wt %, relative to the starting material milk, of water containing *Paenibacillus* sp. bacteria or water that has been treated with immobilized cells of *Paenibacillus* sp. Bacteria into starting material milk, followed by maintaining at a prescribed temperature, separating off the curd thus formed, and performing productization with or without further maturing; a cheese-like dairy product thus produced; and a water purifier packed with a support having *Paenibacillus* sp. bacteria immobilized thereon and a filter medium as a packing material.

20 Claims, No Drawings

CHEESE-LIKE DAIRY PRODUCTS AND PROCESS FOR PRODUCING THE SAME

This application is a National Stage application of PCT/JP02/03569, filed Apr. 10, 2002. Priority to Japanese application 2001-110756, filed Apr. 10, 2001, is claimed.

TECHNICAL FIELD

The present invention relates to a cheese-like dairy product and a method of producing the same. More specifically, the present invention relates to a method of producing a cheese-like dairy product in which, using water containing *Paenibacillus* sp. bacteria or water that has been treated with immobilized cells of *Paenibacillus* sp. bacteria, starting material milk is coagulated, and the viable count of general live bacteria, coli bacteria, coliform bacteria and so on is markedly reduced, whereby it becomes possible to produce a novel cheese-like dairy product having good flavor and safety as a product, and to the product produced. The present invention is useful as an invention providing a novel technique that enables such a cheese-like dairy product having good flavor and safety to be produced by utilizing the functions of *Paenibacillus* sp. bacteria, without using a starter or rennet as used in conventional cheese production.

BACKGROUND ART

In general, in the cheese production process, a method is adopted in which pasteurized cow's milk or goat's milk is used as starting material milk, a lactic acid bacteria starter is added thereto to make the starting material milk acidic, a milk-coagulating enzyme such as chymosin is added to coagulate the milk protein casein, the coagulum (curd) and milk serum (whey) are separated, and the coagulum is matured to produce cheese. The above-mentioned milk-coagulating enzyme does not have sterilizing ability, and hence in general it is only acceptable to use pasteurized milk as the starting material milk.

In this way, with the conventional cheese production method, a method is adopted in which a lactic acid bacteria starter is added to the starting material milk, and once the pH has dropped to a prescribed level, rennet is added to coagulate the milk. With the conventional method, it is thus necessary to proliferate the starter lactic acid bacteria by repeating subculture a plurality of times from a stored strain. Moreover, the starter is added to a large amount of the starting material milk, and hence it is necessary to produce a large amount of a highly active mother starter. Furthermore, quality control must be carried out thoroughly such that there is no contamination with other unwanted bacteria when using the starter.

Moreover, to inoculate with the starter and attain the target pH, it is necessary, for example, to culture the starting material milk at 20° C. for at least several hours. Furthermore, rennet is added to coagulate the milk once the pH has dropped; this rennet is an enzyme taken from calves' stomachs, and is expensive. There is, on the other hand, a method of preparing rennet by culturing a microorganism, but as with the case of taking the rennet from calves' stomachs, this is expensive, and moreover there is a problem that the product becomes bitter.

In view of the prior art described above, it is a problem of the present invention to develop a novel technique enabling a high-quality cheese-like dairy product to be produced without using a starter or rennet as described above; according to the present invention, this problem can be solved by utilizing the functions of *Paenibacillus* sp. cells, instead of using a starter and rennet as described above.

The present invention provides a method of producing a high-quality cheese-like dairy product without using rennet, which is expensive, or a starter, as used in a conventional cheese production method, and a product thus produced.

The present invention relates to a method of producing a cheese-like dairy product, characterized by adding at least 10 wt %, relative to the starting material milk, of water containing *Paenibacillus* sp. bacteria or water that has been treated with immobilized cells of *Paenibacillus* sp. bacteria, into starting material milk, followed by maintaining at a prescribed temperature, separating off the curd thus formed, and performing productization with or without further manufacturing; a cheese-like dairy product thus produced; and a water purifier packed with a support having *Paenibacillus* sp. bacteria immobilized thereon and a filter medium as a packing material.

DISCLOSURE OF THE INVENTION

It is an object of the present invention to provide a method of producing a cheese-like dairy product that enables a high-quality cheese-like dairy product to be produced efficiently and economically, without using rennet, which is expensive, or a starter, as used in a conventional cheese production method.

Moreover, it is an object of the present invention to provide a method of producing a novel cheese-like dairy product that enables the production to be carried out using not only pasteurized milk but also raw milk, and a product thus produced.

Furthermore, it is an object of the present invention to provide a milk-coagulating agent that contains *Paenibacillus* sp. cells and is used when implementing the above-mentioned method for producing a cheese-like dairy product, and a water purifier packed with a support having *Paenibacillus* sp. cells immobilized thereon and a filter medium as a packing material.

To attain the above objects, the present invention is constituted from the following technical means.

(1) A method of producing a cheese-like dairy product, characterized by adding, to starting material milk, water containing *Paenibacillus* sp. bacteria or water that has been treated with immobilized cells of *Paenibacillus* sp. bacteria, maintaining the resulting mixture at a prescribed temperature, separating off the curd thus formed, and making into a product as is or after maturing.

(2) The method according to (1) above, wherein the starting material milk is selected from raw milk, low-temperature-pasteurized milk, high-temperature-sterilized milk, and ultrapasteurized milk.

(3) The method according to (1) above, wherein the water containing *Paenibacillus* sp. bacteria or the water that has been treated with immobilized cells of *Paenibacillus* sp. bacteria is added in an amount of at least 10 wt % relative to the starting material milk.

(4) The method according to (1) above, wherein the mixture is held at room temperature or heated to 30 to 38° C., and the curd and whey are separated once the pH has reached 4 to 6.

(5) The method according to (1) above, wherein the curd is matured by immersing in saturated brine.

(6) The method according to (1) above, wherein water that has been treated using a water purifier packed with a support having *Paenibacillus* sp. bacteria immobilized thereon and a filter medium as a packing material is added to the starting material milk.

(7) The method according to (6) above, wherein the support contains, as a constituent thereof, a sintered body obtained by sintering a ceramic starting material.

(8) A milk-coagulating agent for use in the method according to any of (1) through (7) above, the milk-coagulating agent being for producing the cheese-like dairy product and characterized by containing *Paenibacillus* sp. bacteria and/or an extracellular product thereof.

(9) A cheese-like dairy product produced using the method according to any of (1) through (7) above, the cheese-like dairy product characterized by separating off curd formed using the milk-coagulating action of the water containing *Paenibacillus* sp. bacteria or the water that has been treated with immobilized cells of *Paenibacillus* sp. bacteria, and making into a product as is or after maturing.

(10) A water purifier for use in the method according to any of (1) through (7) above, the water purifier characterized by being packed with a support having *Paenibacillus* sp. bacteria immobilized thereon and a filter medium as a packing material.

(11) The water purifier according to (10) above, wherein the support contains, as a constituent thereof, a sintered body obtained by sintering a ceramic starting material.

The present invention will now be described in more detail.

The present invention relates to a method of producing a cheese-like dairy product, characterized by adding, to starting material milk, water containing *Paenibacillus* sp. bacteria or water that has been treated with immobilized cells of *Paenibacillus* sp. bacteria, maintaining the resulting mixture at a prescribed temperature, separating off the curd thus formed, and making into a product as is or after maturing, and to the product produced.

In the present invention, for example raw milk, low-temperature-pasteurized milk, high-temperature-sterilized milk, ultrapasteurized milk, or the like can be used, but there is no limitation thereto. Out of these, use of low-temperature-pasteurized milk or raw milk having a large number of useful bacteria gives a product having good texture, taste, flavor and so on after maturation, and hence in the present invention it is favorable to use such a starting material milk.

In the present invention, water containing *Paenibacillus* sp. bacteria, or water that has been treated with immobilized cells of *Paenibacillus* sp. bacteria, is added to the starting material milk. This bacterium has been deposited with the National Institute of Advanced Industrial Science and Technology (Independent Administrative Institution), which is a public depository institution, with the accession number being FERM P-18138.

This *Paenibacillus* sp. bacterium is known to be low risk, with most strains falling under level 1 in the new biosafety level classification for pathogenic bacteria described in 'Japanese Journal of Bacteriology, 55 (4): 655-674, 2000'. Moreover, *Paenibacillus* sp. is split off from the *Bacillus* genus, is named in 'IJSB (International Journal of Systematic Bacteriology), Vol. 147, 289-298, 1997' naming only the major fatty acids characteristically, and has been registered using 16S rRNA DNA analysis.

The water containing *Paenibacillus* sp. bacteria, or the water that has been treated with immobilized cells of *Paenibacillus* sp. bacteria, is preferably prepared, for example, by treating water using a water purifier packed with a support having *Paenibacillus* sp. bacteria immobilized thereon and a filter medium as a packing material. However, there is no limitation thereto, with it being possible to similarly use water having *Paenibacillus* sp. bacteria added thereto, or water prepared by making water come into contact with immobilized cells of *Paenibacillus* sp. bacteria, or any water prepared using a method having equivalent effects thereto.

Preferable examples of the support and the filter medium in the water purifier are supports and filter media selected as appropriate from herkimer diamond, lapis lazuli, howlite, amethyst, garnet, sapphire, aquamarine, yellow jasper, rose quartz, moonstone, carnelian, tourmaline, pearl, amber, ferrite magnet, granite porphyry, coral, phyllite, quartz dioritoporphyrite, graphite silica, magnetite, lodestone, quartz schist, bincho charcoal, bamboo charcoal, activated charcoal, KDF alloy, water containing agate, ceramics, and so on; however, there is no limitation thereto, with it being possible to similarly use supports and filter media having equivalent effects thereto.

Because the water prepared using a method as described above contains *Paenibacillus* sp. bacteria (and an extracellular product thereof), a milk-coagulating action can be obtained merely by adding this water to the starting material milk. The water containing *Paenibacillus* sp. bacteria, or the water in which are immobilized *Paenibacillus* sp. bacteria, is added in a suitable amount to the starting material milk. Here, the amount added of the water is preferably at least 10 wt %; the higher the amount of the water, the faster the starting material milk is coagulated through the milk-coagulating action of the water. However, although this method is fine in the case that the amount produced of the product is small, in the case that the amount produced of the product is more than a certain amount (e.g. more than 500 liters), then a vessel (cheese vat) having double the capacity will be required.

Considering the production efficiency at a factory, this would be very disadvantageous, and hence it is preferable to first produce a fermentation starter using the starting material milk and the water containing *Paenibacillus* sp. bacteria. Specifically, taking 1% of the starting material milk as a guide, starting material milk for the starter is prepared, and the same amount of the water containing *Paenibacillus* sp. bacteria is added thereto. The resulting mixture is maintained at 30 to 38° C. for approximately 24 hours, thus carrying out fermentation and culturing, and once the pH has reached approximately 4.6, this culture is added to the starting material milk as a starter. Through this operation, the production efficiency can be kept high, and hence the production efficiency of the cheese-like dairy product using the water containing *Paenibacillus* sp. bacteria can be improved.

Next, the starting material milk is heated to 30 to 38° C. This temperature condition is the optimum coagulation reaction temperature. After the starting material milk has been coagulated, the curd is cut up, and then the temperature is raised to 30 to 53° C. while stirring. At this time, it is preferable to raise the temperature gradually rather than at a single stroke. As a result, it becomes possible to utilize to the utmost the action of bacteria that are activated in any of various temperature ranges, i.e. psychrophiles, mesophiles, and thermophiles. Moreover, in the case of producing a hard type cheese-like dairy product, the temperature is raised to approximately 53° C.

Next, once the acidity has reached pH 6 to 4, the curd and whey are separated, and once transparent whey has appeared, whey removal is carried out. In this case, the curd is subjected to the whey removal once the acidity has reached pH 6 to 4; the subsequent quality and flavor of the cheese-like dairy product differs between the case that the whey removal is carried out when the acidity is pH 4 and the case that the whey removal is carried out when the acidity is pH 6. It is thus preferable to carry out the whey removal at a suitable acidity between pH 6 and 4, giving consideration to the desired quality and flavor of the cheese-like dairy product.

Next, the curd is matured. When maturing the curd, the curd is steeped, for example, in saturated brine, preferably approximately 20% saturated brine. By steeping the curd in 20% saturated brine after the curd has been pressed in gauze, a flavorsome cheese-like dairy product can be produced. Moreover, by steeping the curd in saturated brine for 3 months to 1 year or longer, the degree of maturation can be increased.

Next, the curd is taken out from the saturated brine, and is dewatered whereby a fresh type product can be produced, or is air-dried and stored whereby a semi-hard type product or a hard type product can be produced. By steeping the curd in saturated brine in this way, infiltration of unwanted bacteria from the outside can be prevented, and hence a highly safe cheese-like dairy product can be produced, and moreover a cheese-like dairy product having a mellow saltiness can be obtained. So long as the cheese-like dairy product of the present invention is prepared by coagulating milk using the method described above, there are no particular limitations on the type of the cheese-like dairy product, with all types of product being included in the present invention. Moreover, a milk-coagulating agent of the present invention is prepared by incorporating therein as an active ingredient Paenibacillus sp. bacteria and/or an extracellular product thereof, and is used formulated into a suitable form. There are no particular limitations on the method of incorporating the active ingredient, the proportion of the active ingredient, or the carrier, with design being carried out as appropriate in accordance with the usage.

A water purifier of the present invention is characterized by being packed with a support having Paenibacillus sp. bacteria as described above immobilized thereon and a filter medium as a packing material. Here, a preferable example of the support is a ceramic sintered body manufactured by subjecting a ceramic starting material to forming and sintering, but there is no limitation thereto, with it being possible to similarly use any other support having equivalent effects. Moreover, preferable examples of the filter medium are supports and filter media selected as appropriate from herkimer diamond, lapis lazuli, howlite, amethyst, garnet, sapphire, aquamarine, yellowjasper, rosequartz, moonstone, carnelian, tourmaline, pearl, amber, ferrite magnet, granite porphyry, coral, phyllite, quartz diorite-porphyrite, graphite silica, magnetite, lodestone, quartz schist, bincho charcoal, bamboo charcoal, activated charcoal, KDF alloy, water containing agate, ceramics, and so on, with it being possible to use these in combination as appropriate. In the present invention, the above-mentioned supports and filter media are used in a freely chosen combination with design being carried out as appropriate. With the water purifier of the present invention, apart from the constitution specified above, an ordinary water purifier constitution can be used, with there being no particular limitations on the constitution.

BEST MODE FOR CARRYING OUT THE INVENTION

Next, the present invention will be described concretely through experimental examples and working examples; however, the present invention is not limited whatsoever by the following experimental examples and working examples.

EXPERIMENTAL EXAMPLE 1

In the present experimental example, water that had been treated using a water purifier packed with a support having Paenibacillus sp. bacteria immobilized thereon and a filter medium as a packing material was added to starting material milk, thus trialing the production of a raw cheese-like product having the form of soft lumps.

(1) Experimental Method

1) Water Purifier

A water purifier packed with a ceramic sintered body having cells of Paenibacillus sp. bacteria (FERM P-18138) immobilized thereon and another filter medium as a packing material was used.

2) Preparation of Cheese-Like Dairy Product 3 liters of raw milk and 2 liters of water that had been passed through the water purifier were mixed together to prepare 5 liters of mixed liquid. Neither the raw milk nor the water had been subjected to heat treatment. The mixed liquid was put into a vessel, the vessel was immersed in steep water, the temperature was held at 20° C., and coagulation was carried out over 24 hours. Maintaining room temperature at 20° C., the experiment was carried out 10 times for raw cow's milk, and 5 times for goat's milk. Additives (fermenting yeast, interfacial yeast, rennin) were not added to the above-mentioned mixed liquid. After the mixed liquid had been coagulated, the milk plasma was removed using a straining cloth at 20° C. over 24 hours, and then after a further 24 hours, the coagulated mass was put into a shaping mold and thus shaped. Sudden changes were seen in the product 24 hours and 48 hours after putting into the mold. Salting was carried out twice: approximately 2% of dry salt relative to the weight of the cheese was sprinkled onto the surface immediately after putting into the mold and after the first change. 48 hours after carrying out the shaping, the cheese was removed from the mold, and maturation was carried out at approximately 15° C.

3) Bacteriological Analysis

To test the safety of the product, an analysis was carried out of the viable count in the product of Staphylococcus aureus, salmonella bacteria, coli bacteria and Listeria monocytogenes.

(2) Results

1) Physicochemical Properties

For each experiment, the mixed liquid was coagulated in 24 hours, and 24 hours after straining the coagulum produced was of high quality, having an appearance like soft cheese that is spread on bread, and being very smooth on the tongue and thus highly palatable. 48 hours after putting into the mold, the cheese-like product produced maintained its shape without disintegrating. The cheese closely resembled orthodox soft Camembert cheese in terms of density, feel and texture.

2) Bacteriological Properties

The results of the bacteriological analysis are shown in Tables 1 to 3. Here, Table 3 shows the analysis results for a cheese of a comparative example prepared through a traditional production method using the same starting material milk.

TABLE 1

Raw cow's milk cheese-like product of the present invention

| Analyzed bacteria | Result | Standard value |
|---|---|---|
| Staphylococcus aureus/g | | |
| Salmonella bacteria/g | Zero | Zero |
| Coli bacteria/g | | |
| Listeria monocytogenes/25 g | Zero | Zero |

TABLE 2

Goat's milk cheese-like product of the present invention matured for 3 months

| Analyzed bacteria | Result | Standard value |
|---|---|---|
| Staphylococcus aureus/g | | |
| Salmonella bacteria/g | Zero | Zero |
| Coli bacteria/g | | |
| Listeria monocytogenes/25 g | Zero | Zero |

TABLE 3

Raw cow's milk cheese produced using traditional method (comparative example)

| Analyzed bacteria | Result | Standard value |
|---|---|---|
| Staphylococcus aureus/g | | |
| Salmonella bacteria/g | Zero | Zero |
| Coli bacteria/g | | |

From the analysis results in Tables 1 and 2, it can be seen that the viable count was below the standard value for all of the types of bacteria, showing that water containing *Paenibacillus* sp. bacteria (i.e. containing an extracellular product thereof) has an action of inhibiting these types of bacteria. It can thus be seen that by using water containing *Paenibacillus* sp. bacteria, production can be carried out adequately using raw milk, not only pasteurized milk.

It is highly significant that the number of bacteria detected in the cheese-like product produced was very small. Looking at the results comparing the raw cow's milk cheese produced using the traditional method (Table 3) and the cheese-like products produced using a water purifier according to the present invention (Tables 1 and 2), the analysis results show that the number of bacteria in the latter cheese-like products is very low. That is, comparing with the analysis results for the cheese produced using the traditional method (Table 3), it can be seen that the number of bacteria in the cheese-like product produced using the water purifier (Table 1) is very low. These two types of analysis results were obtained from cheese and a cheese-like product prepared using the same starting material milk. Furthermore, the bacteriological analysis results in Table 2 were also good. These analysis results for the cheese-like product matured for 3 months show a bacterial contamination rate that is almost unbelievably low for a raw milk product.

With the present invention, a soft lumpy cheese-like product can be produced merely by mixing together water that has been passed through a water purifier as described above and raw milk (i.e. without adding additives). This fact would be very hard to believe for a person working in traditional cheese production. A big advantage of the present invention is that the number of bacteria in the cheese-like product is greatly reduced, and hence a low habitation rate of pathogenic bacteria can be completely (100%) maintained. Data on the time limit for consumption of the product is also excellent.

Next, working examples with regard to methods of producing a hard type cheese-like product, a semi-hard type cheese-like product, a pasta filata type cheese-like product, and a fresh type cheese-like product will be described in detail.

EXAMPLE 1

(Production of Hard Type Cheese-like Product)

Starting material milk was coagulated as in Experimental Example 1, the curd produced was cut up, and then the curd was heated from 30° C. to 53° C., thus discharging whey and lactose from the curd as much as possible. Once the curd particles had become about as big as grains of rice, the curd was collected together in whey, and was then put into a mold, and was pressed. Next, the curd was steeped in brine and heated. Maturation was carried out for 4 months during which time surface treatment was carried out, whereby a hard type cheese-like product was obtained.

EXAMPLE 2

(Production of Semi-hard Type Cheese-like Product)

Curd was prepared as in Experimental Example 1, and once the pH of the curd had become approximately 6.4, the curd was accumulated in whey, preliminary pressing was carried out to produce a mat, and then the curd was put into a mold and pressed by placing a weight thereon, whereby a semi-hard type cheese-like product was obtained.

EXAMPLE 3

(Production of Pasta Filata Type Cheese-like Product)

Curd was prepared as in Experimental Example 1, and once the pH of the curd had become 5.2, the curd was kneaded in hot water from 85° C. to 100° C. to produce a soft dough like mochi rice cake, and then after shaping, steeping in brine was carried out, whereby a pasta filata type cheese-like product was obtained.

EXAMPLE 4

(Production of Fresh Type Cheese-like Product)

Curd was prepared as in Experimental Example 1, the pH of the curd was reduced as far as 4.8, the whey was drained off, and a small amount of salt (approximately 1%) for shaping was mixed in and kneading was carried out. Once the shape had set, the curd was put into brine and heated, and then dry salt was rubbed in (salt content approximately 2% of cheese). Next, maturation was carried out for 3 months during which time surface treatment was carried out, whereby a fresh type cheese-like product was obtained.

INDUSTRIAL APPLICABILITY

According to the cheese-like dairy product and method of producing the same of the present invention, the following remarkable effects are obtained.

(1) A high-quality cheese-like dairy product can be produced efficiently and economically, without using rennet, which is expensive, or a starter, merely by adding at least 10 wt % of water containing *Paenibacillus* sp. bacteria (i.e. containing an extracellular product thereof) to starting material milk.

(2) A water purifier packed with a support having *Paenibacillus* sp. bacteria immobilized thereon and a filter medium as a packing material can be provided.

(3) A cheese-like dairy product that is highly safe and has a mature flavor can be provided.

(4) A milk-coagulating agent for production of a cheese-like dairy product that contains *Paenibacillus* sp. bacteria and enables a cheese-like dairy product as described above to be produced can be provided.

Statement of Deposited Microorganism

Name and address of depository institution: International Patent Organism Depositary, National Institute of Advanced Industrial Science and Technology (Independent Administrative Institution) (address: Tsukuba Central 6, 1-1-1 Higashi, Tsukuba, Ibaraki, Japan (postal code 305-8566))

Date deposited: Dec. 8, 2000

Accession number: FERM P-18138

Indication of microorganism: Paeni

The invention claimed is:

1. A method of producing a cheese-like dairy product, comprising adding at least 10 wt. %, relative to a starting material milk, of water containing *Paenibacillus* sp. bacteria or at least 10 wt. %, relative to a starting material milk, of water that has been treated with immobilized cells of said *Paenibacillus* sp. Bacteria into the starting material milk to form a mixture, followed by maintaining the mixture at a temperature of at least 20° C. to form curd, and separating off the curd thus formed.

2. The method according to claim 1, wherein the starting material milk is any one of raw milk, low-temperature-pasteurized milk, high-temperature-sterilized milk, and ultrapasteurized milk.

3. The method according to claim 1, wherein the mixture is held at 20° C. or heated to 30 to 38° C., and further comprising separating the curd and whey once the pH has reached 4 to 6.

4. The method according to claim 1, further comprising maturing the separated off curd by immersing it in saturated brine.

5. The method according to claim 1, wherein water, which has been treated using a water purifier packed with a support having said *Paenibacillus* sp. bacteria immobilized thereon and a filter medium as a packing material, is added to the starting material milk.

6. The method according to claim 5, wherein the support contains, as a constituent thereof, a sintered body obtained by sintering a ceramic starting material.

7. A milk-coagulating agent for producing a cheese-like dairy product, said agent comprising at least one of *Paenibacillus* sp. Bacteria and an extracellular product thereof.

8. A cheese-like dairy product produced using the method according to claim 1.

9. A water purifier packed with a support having *Paenibacillus* sp. bacteria immobilized thereon and a filter medium.

10. The water purifier according to claim 9, wherein the support comprises, as a constituent thereof, a sintered body obtained by sintering a ceramic starting material.

11. The milk-coagulating agent according to claim 7, said agent comprising *Paenibacillus* sp. Bacteria.

12. The method of producing a cheese-like dairy product according to claim 1, comprising adding at least 10 wt. %, relative to a starting material milk, of water containing *Paenibacillus* sp. bacteria into the starting material milk to form a mixture.

13. The method of producing a cheese-like dairy product according to claim 1, comprising adding at least 10 wt. %, relative to a starting material milk, of water that has been treated with immobilized cells of said *Paenibacillus* sp. Bacteria into the starting material milk to form a mixture.

14. The method of producing a cheese-like dairy product according to claim 2, comprising adding at least 10 wt. %, relative to a starting material milk, of water containing *Paenibacillus* sp. bacteria into the starting material milk to form a mixture.

15. The method of producing a cheese-like dairy product according to claim 2, comprising adding at least 10 wt. %, relative to a starting material milk, of water that has been treated with immobilized cells of said *Paenibacillus* sp. Bacteria into the starting material milk to form a mixture.

16. The method of producing a cheese-like dairy product according to claim 3, comprising adding at least 10 wt. %, relative to a starting material milk, of water containing *Paenibacillus* sp. bacteria into the starting material milk to form a mixture.

17. The method of producing a cheese-like dairy product according to claim 3, comprising adding at least 10 wt. %, relative to a starting material milk, of water that has been treated with immobilized cells of said *Paenibacillus* sp. Bacteria into the starting material milk to form a mixture.

18. The method of producing a cheese-like dairy product according to claim 4, comprising adding at least 10 wt. %, relative to a starting material milk, of water containing *Paenibacillus* sp. bacteria into the starting material milk to form a mixture.

19. The method of producing a cheese-like dairy product according to claim 4, comprising adding at least 10 wt. %, relative to a starting material milk, of water that has been treated with immobilized cells of said *Paenibacillus* sp. Bacteria into the starting material milk to form a mixture.

20. A cheese-like dairy product produced using the method according to claim 18.

* * * * *